(12) United States Patent
Kaufmann et al.

(10) Patent No.: US 10,344,451 B2
(45) Date of Patent: Jul. 9, 2019

(54) UNDERCARRIAGE ASSEMBLY

(71) Applicant: Caterpillar Inc., Peoria, IL (US)

(72) Inventors: Gregory J. Kaufmann, Metamora, IL (US); Timothy A. Thorson, Morton, IL (US)

(73) Assignee: Caterpillar Inc., Deerfield, IL (US)

( * ) Notice: Subject to any disclaimer, the term of this patent is extended or adjusted under 35 U.S.C. 154(b) by 176 days.

(21) Appl. No.: 15/267,316

(22) Filed: Sep. 16, 2016

(65) Prior Publication Data

US 2018/0079459 A1  Mar. 22, 2018

(51) Int. Cl.
*B62D 55/06* (2006.01)
*E02F 9/02* (2006.01)
*B62D 55/26* (2006.01)
*B62D 55/28* (2006.01)
*E02F 3/34* (2006.01)
*B62D 55/21* (2006.01)

(52) U.S. Cl.
CPC ............... *E02F 9/02* (2013.01); *B62D 55/06* (2013.01); *B62D 55/26* (2013.01); *B62D 55/28* (2013.01); *B62D 55/21* (2013.01); *E02F 3/34* (2013.01)

(58) Field of Classification Search
CPC ...... B62D 55/205; B62D 55/26; B62D 55/32; E02F 9/02; E02F 3/34
See application file for complete search history.

(56) References Cited

U.S. PATENT DOCUMENTS

| 3,795,431 | A | * | 3/1974 | Boggs | .................... B62D 55/12 305/198 |
| 3,897,980 | A | | 8/1975 | Dester et al. | |
| 4,892,365 | A | | 1/1990 | Szakacs | |
| 2,897,014 | A | | 8/1998 | Darragh, Jr. | |
| 9,333,998 | B2 | | 5/2016 | Thorson et al. | |
| 2009/0212624 | A1 | | 8/2009 | Norrish et al. | |
| 2016/0297487 | A1 | * | 10/2016 | Thorson | ................. B62D 55/32 |

FOREIGN PATENT DOCUMENTS

WO  8303582  10/1983

* cited by examiner

*Primary Examiner* — Tony H Winner
*Assistant Examiner* — Marlon A Arce
(74) *Attorney, Agent, or Firm* — William R. Tinker

(57) ABSTRACT

An undercarriage assembly associated with a machine is provided. The undercarriage assembly includes a ground engaging track adapted to crawl on a ground surface. The ground engaging track includes a plurality of track shoes. The ground engaging track also includes a plurality of pairs of track links pivotally connected to one another. Each of the track links includes a body member having a first side surface and a second side surface. The body member also includes a mounting hole defined in the body member. The mounting hole extends angularly with respect to the shoe surface. The ground engaging track further includes a coupling mechanism. The coupling mechanism includes a coupling member adapted to be received within the mounting hole, and welded to the track shoe to couple each of the plurality of track shoes with the respective track links.

15 Claims, 5 Drawing Sheets

UNDERCARRIAGE ASSEMBLY

TECHNICAL FIELD

The present disclosure relates to an undercarriage assembly of a machine, and more particularly to a coupling mechanism associated with a ground engaging track of the undercarriage assembly.

BACKGROUND

An undercarriage assembly associated with a machine, such as an off-highway vehicle, allows movement of the machine on a ground surface. The undercarriage assembly includes a pair of ground engaging tracks on either side of the machine that assist in the movement of the machine. Each of the ground engaging tracks include a number of track links and track shoes which are coupled to one another using mechanical fasteners, such as nuts and bolts, to form the endless ground engaging track. Assembly process of the track shoes and the track links using nuts and bolts is complex, time consuming, and costly.

If the bolted joint is subjected to loads exceeding the design capability, the nuts and bolts could loosen and or break overtime allowing the track shoes to detach. This may increase downtime and operating costs associated with the machine, thereby affecting overall machine efficiency.

U.S. Pat. No. 4,892,365 describes a double pin track unit for a vehicle track assembly. The track unit includes a track body and two bore extending transversely through the body. The track unit also includes a track pin within each bore extending the length of each bore. The track unit further includes links keyed to the track pins and extending radially from the bores. The track unit includes sleeves keyed to the track pins for separating the links. The track unit also includes elastomeric sleeves in the toroidal space between the outer diameter of track pin and the inner diameter of the bore.

SUMMARY OF THE DISCLOSURE

In one aspect of the present disclosure, an undercarriage assembly associated with a machine is provided. The undercarriage assembly includes a ground engaging track adapted to crawl on a ground surface. The ground engaging track includes a plurality of track shoes. Each of the plurality of track shoes define an inner surface and an outer surface. Each of the plurality of track shoes includes a grouser disposed on the outer surface. The ground engaging track also includes a plurality of pairs of track links pivotally connected to one another. Each of the track links includes a body member having a first side surface and a second side surface. The body member includes a shoe surface extending between the first and second side surfaces. The shoe surface abuts the inner surface of the track shoe. The body member also includes a mounting hole defined in the body member. The mounting hole extends angularly with respect to the shoe surface. The ground engaging track further includes a coupling mechanism. The coupling mechanism includes a coupling member adapted to be received within the mounting hole. The coupling member is welded to the track shoe to couple each of the plurality of track shoes with the respective track links.

In another aspect of the present disclosure, a machine is provided. The machine includes an engine. The machine also includes a frame. The machine further includes an undercarriage assembly coupled to the frame. The undercarriage assembly includes a ground engaging track adapted to crawl on a ground surface. The ground engaging track includes a plurality of track shoes. Each of the plurality of track shoes define an inner surface and an outer surface. Each of the plurality of track shoes includes a grouser disposed on the outer surface. The ground engaging track also includes a plurality of pairs of track links pivotally connected to one another. Each of the track links includes a body member having a first side surface and a second side surface. The body member includes a shoe surface extending between the first and second side surfaces. The shoe surface abuts the inner surface of the track shoe. The body member also includes a mounting hole defined in the body member. The mounting hole extends angularly with respect to the shoe surface. The ground engaging track further includes a coupling mechanism. The coupling mechanism includes a coupling member adapted to be received within the mounting hole. The coupling member is welded to the track shoe to couple each of the plurality of track shoes with the respective track links.

In yet another aspect of the present disclosure, a track link is provided. The track link includes a body member having a first side surface and a second side surface. The body member includes a shoe surface extending between the first and second side surfaces. The body member also includes a mounting hole defined in the body member. The mounting hole extends angularly with respect to the shoe surface. The mounting hole is adapted to receive a coupling member which is welded to a track shoe.

Other features and aspects of this disclosure will be apparent from the following description and the accompanying drawings.

DETAILED DESCRIPTION

Wherever possible, the same reference numbers will be used throughout the drawings to refer to the same or the like parts. Also, corresponding or similar reference numbers will be used throughout the drawings to refer to the same or corresponding parts.

Figure 1:
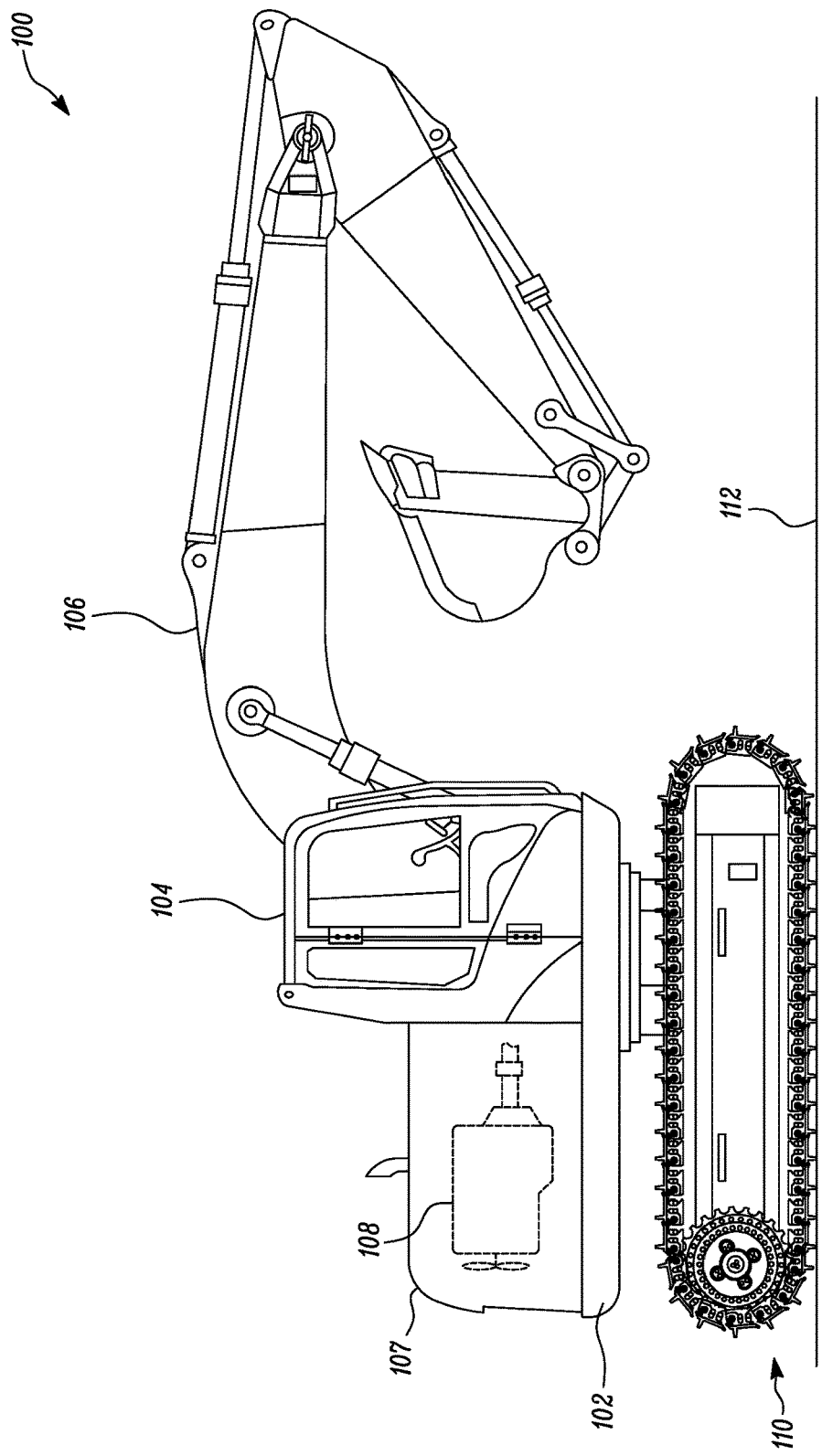
FIG. 1 is a side view of an exemplary machine, according to one embodiment of the present disclosure.

Referring to FIG. 1, an exemplary machine 100 is depicted. The machine 100 is a mobile machine associated with an industry such as, but not limited to, mining, construction, farming, earthmoving, or another industry known in the art. In the illustrated embodiment, the machine 100 is an excavator. Alternatively, the machine 100 may embody any earth moving machine, such as, a dozer, a loader, a backhoe, a motor grader, or any other earth moving machine, without limiting the scope of the present disclosure.

The machine 100 includes a frame 102. An operator cabin 104 is supported on the frame 102. The machine 100 also includes an implement 106, such as, a bucket for digging or excavation purposes. Further, the machine 100 includes an engine 108 mounted within an enclosure 107. The engine 108 may be used to power multiple systems and components of the machine 100 that cooperate to accomplish various machine operations. The engine 108 may embody an internal combustion engine, such as, a diesel engine, a gasoline engine, a gaseous fuel-powered engine, or any other suitable engine. The engine 108 may be fueled by one or a combination of gasoline, diesel fuel, biodiesel, dimethyl ether, alcohol, natural gas, propane, or any other combustion fuel known in the art.

The machine 100 includes an undercarriage assembly 110. The undercarriage assembly 110 is coupled to the frame 102 of the machine 100 such that the frame 102 is rotatable with respect to the undercarriage assembly 110. The undercarriage assembly 110 is driven by the engine 108. The undercarriage assembly 110 is adapted to support and propel the machine 100 on a ground surface 112 in an operating condition of the machine 100.

Figure 2:
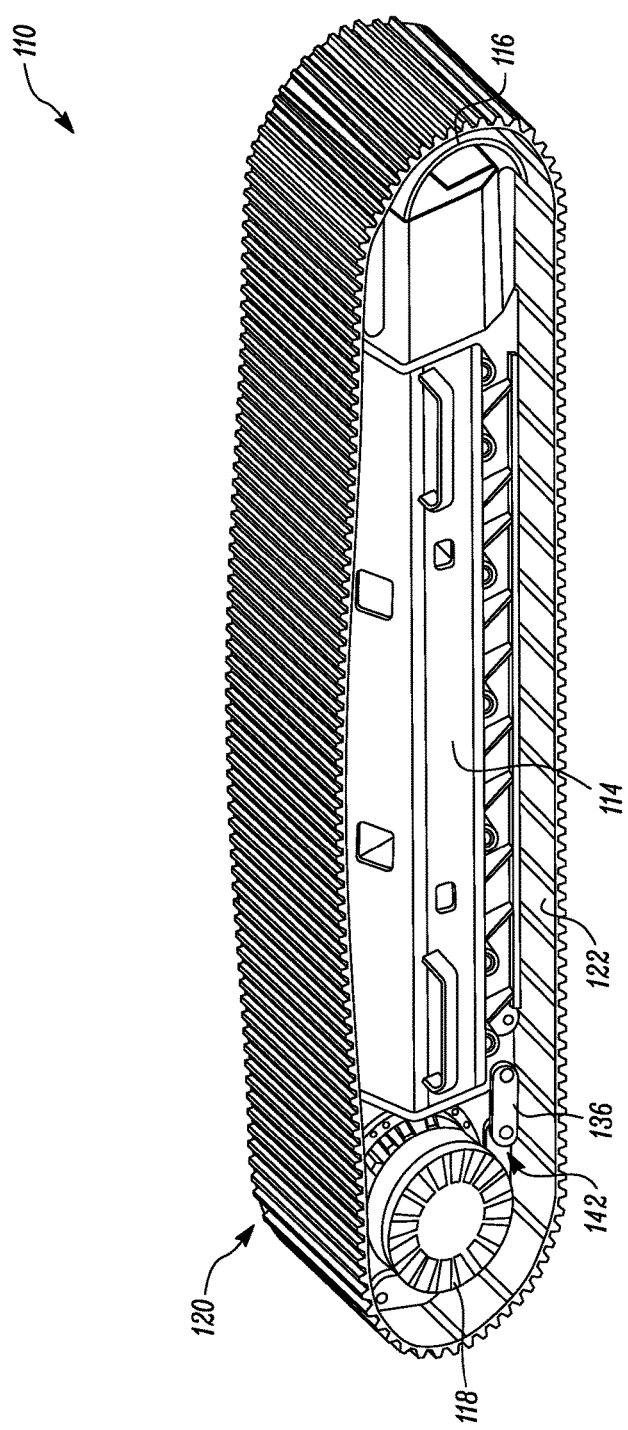
FIG. 2 is a perspective view of an undercarriage assembly of the machine of FIG. 1.

Referring to FIG. 2, the undercarriage assembly 110 includes a track roller frame 114, an idler 116, a drive sprocket 118, and a ground engaging track 120. The idler 116 is coupled to one end of the track roller frame 114. The drive sprocket 118 is coupled to another end of the track roller frame 114. The ground engaging track 120 is an endless track that surrounds the track roller frame 114, the idler 116, and the drive sprocket 118. The drive sprocket 118 is driven by the engine 108 of the machine 100 to rotate the ground engaging track 120. The drive sprocket 118 in turn provides a driving linear force that allows crawling of the ground engaging track 120 on the ground surface 112. In the illustrated embodiment, the ground engaging track 120 includes an oval track configuration. Alternatively, the ground engaging track 120 may include other track configurations such as, but not limited to, high-drive configuration or any other track configurations known in the art. Further, the undercarriage assembly 110 may include additional components (not shown) such as, rollers, carriers, track guides etc., without limiting the scope of the disclosure.

Figure 3:
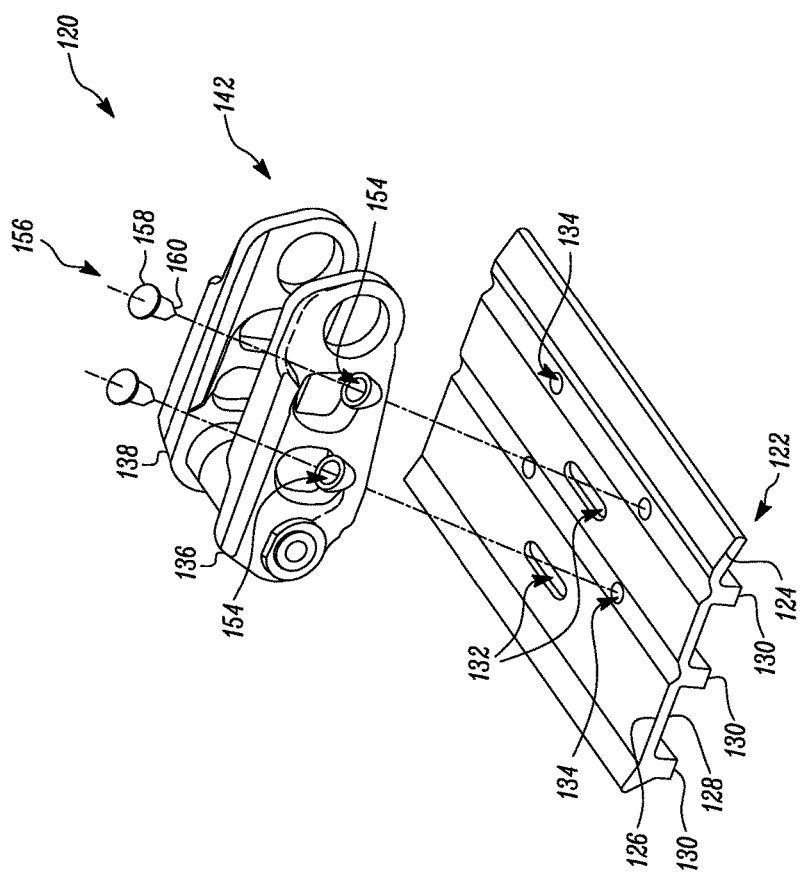
FIG. 3 is an exploded view of a track shoe and a pair of track links associated with the ground engaging track of the undercarriage assembly of FIG. 1, according to one embodiment of the present disclosure.

Referring to FIGS. 2 and 3, the ground engaging track 120 includes a number of track shoes 122. The number of track shoes 122 engage with the ground surface 112. Construction and design of a single track shoe 122 will now be explained in relation to FIG. 3. However, it should be noted that the description provided below is equally applicable to all the track shoes 122 of the ground engaging track 120, without any limitations.

As shown in FIG. 3, the track shoe 122 includes a rectangular planar base 124 defining an inner surface 126 and an outer surface 128. The outer surface 128 is disposed opposite to the inner surface 126. The outer surface 128 contacts the ground surface 112 when the machine 100 is in operation. Further, the rectangular planar base 124 includes a number of trap holes 132. The trap holes 132 extend between the inner surface 126 and the outer surface 128 of the rectangular planar base 124. The trap holes 132 provide an escape path for material like dirt or gravel present in the ground engaging track 120. In one example, the rectangular planar base 124 may include two trap holes 132. Alternatively, the rectangular planar base 124 may include any number of trap holes 132, without limiting the scope of the disclosure.

The track shoe 122 also includes a number of grousers 130 provided on the outer surface 128 of the rectangular planar base 124. The grousers 130 increase traction of the ground engaging track 120 on the ground surface 112. In the illustrated embodiment, the track shoe 122 includes three grousers 130. Alternatively, the track shoe 122 may include any number of grousers 130, without limiting the scope of the disclosure. Further, the rectangular planar base 124 and the grousers 130 of the track shoe 122 may be manufactured as a unitary component. Alternatively, the rectangular planar base 124 and the grousers 130 may be manufactured as separate components and are coupled to one another.

In the illustrated embodiment, the grousers 130 of the track shoe 122 includes a number of first apertures 134. The number of first apertures 134 are embodied as blind holes extending from the inner surface 126 of the rectangular planar base 124 and into the grousers 130. Alternatively, the grousers 130 may omit the number of first apertures 134, without limiting the scope of the disclosure.

The ground engaging track 120 includes a number of pair of track links 136, 138. Each pair of track links 136, 138 are pivotally connected to an adjacent pair of track links 136, 138 to form an endless link assembly 142 (see FIG. 2). The pair of track links 136, 138 may have complex contours with curves, recesses, and projections. For explanatory purposes, the track link 136 will now be described in detail with reference to FIG. 4. However, it should be noted that the description is also applicable to the track link 138, without any limitations.

Figure 4:
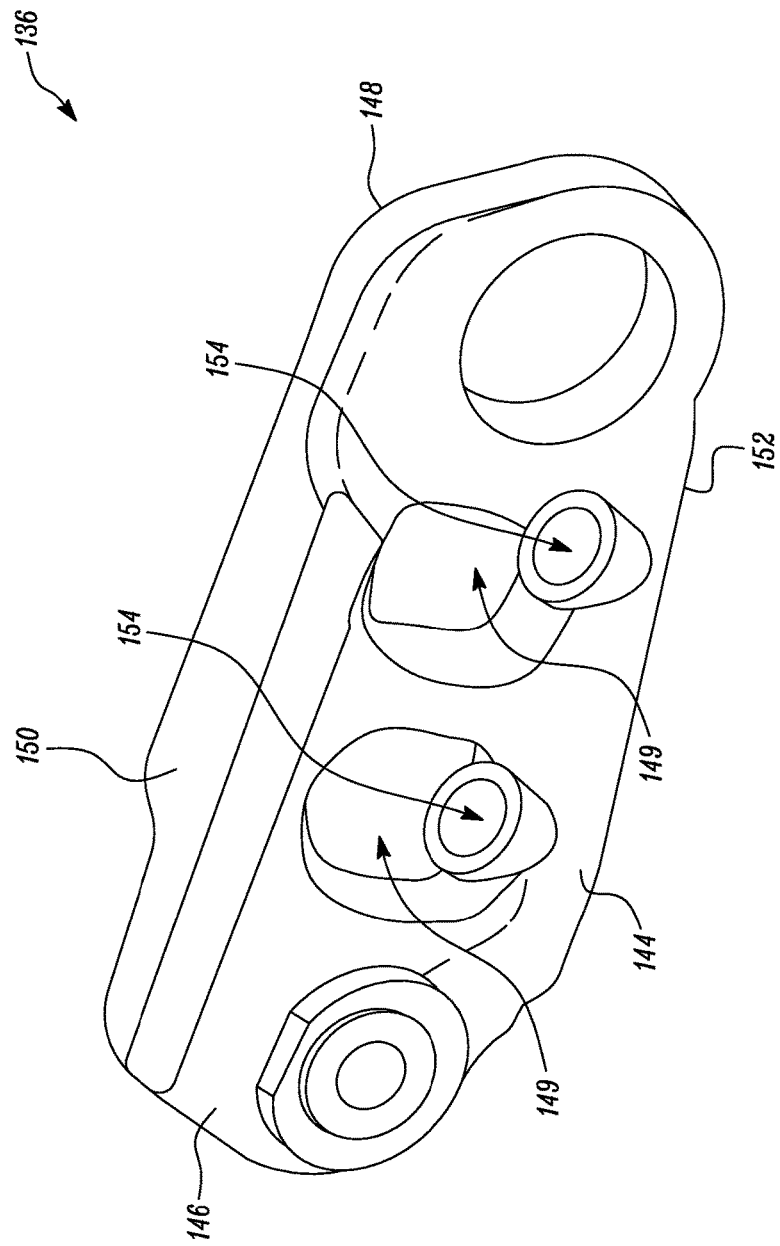
FIG. 4 is a perspective view of a track link of the ground engaging track of FIG. 1, according to various concepts of the present disclosure.

Referring to FIG. 4, the track link 136 includes a body member 144 having a first side surface 146 and a second side surface 148 opposite to the first side surface 146. The body member 144 has a wider portion in the middle and laterally offset narrower portions at its ends. The laterally offset narrower portions assist in coupling of the pair of track links 136, 138 to the adjacent pair of track links 136, 138. The body member 144 includes a rail surface 150 defined at a top section of the track link 136. The rail surface 150 extends between the first side surface 146 and the second side surface 148.

Further, the body member 144 includes a shoe surface 152 defined at a bottom section of the track link 136. The shoe surface 152 extends between the first side surface 146 and the second side surface 148. The shoe surface 152 abuts the inner surface 126 of the track shoe 122 (see FIG. 3), when the track link 136 is coupled with the track shoe 122. Further, the body member 144 defines a pair of windows 149. Each of the pair of windows 149 extend from the first side surface 146 to the second side surface 148. The body member 144 may include any number of windows 149 without any limitations. The body member 144 may omit the windows 149, without limiting the scope of the disclosure.

The body member 144 includes a number of mounting holes 154. In the illustrated embodiment, the body member 144 includes two mounting holes 154. Further, the mounting holes 154 extend angularly with respect to the shoe surface 152. In another embodiment, the mounting holes 154 may extend perpendicularly from the shoe surface 152, without limiting the scope of the disclosure. It should be noted that the body member 144 may include a single mounting hole 154 or any number of mounting holes 154, without limiting the scope of the disclosure.

As shown in FIG. 3, the track link 136 is positioned on the track shoe 122 such that the mounting holes 154 are positioned above the grousers 130 of the track shoe 122. More particularly, the track link 136 is positioned such that the mounting holes 154 of the track link 136 are in alignment with the first apertures 134 of the grousers 130. Alternatively, the track link 136 may be positioned anywhere on the track shoe 122, according to the machine requirements.

Further, the ground engaging track 120 includes a coupling mechanism 156. The coupling mechanism 156 is used to couple the pair of track links 136, 138 to the track shoe 122. The coupling mechanism 156 will now be described in detail with reference to the coupling of the track link 136 with the track shoe 122. However, it should be noted that the coupling mechanism 156 can be used to couple the track links 136, 138 with the respective track shoe 122, without any limitations.

The coupling mechanism 156 includes a number of coupling members 158. In the illustrated embodiment, the coupling mechanism 156 includes two coupling members 158. The number of coupling members 158 correspond to the number of mounting holes 154 provided in the track link 136. The coupling members 158 may be embodied as welding studs made of hardened steel having high shear strength, without any limitations.

Each of the coupling members 158 includes a lower section 160. The coupling members 158 are aligned and received within the respective mounting holes 154 of the track link 136. Further, the mounting holes 154 are aligned with the first apertures 134 of the grousers 130 to receive the lower section 160 of the coupling members 158. Further, the coupling members 158 are welded to the track shoe 122, such that the coupling members 158 couples and secures the track link 136 to the track shoe 122 of the ground engaging track 120.

In another embodiment, the lower section 160 of the coupling members 158 may abut the inner surface 126 of the track shoe 122. The coupling members 158 are then welded with the track shoe 122, such that the lower section 160 of each of the coupling members 158 is secured to the inner surface 126 of the track shoe 122, thereby coupling the track link 136 to the track shoe 122.

The lower section 160 of the coupling members 158 is welded to the track shoe 122 using resistance welding. More particularly, the welding may be Electric Resistance Welding (ERW). The lower section 160 of the coupling members 158 may be welded to the track shoe 122 using various other welding techniques including, but not limited to, fusion welding, or any other welding techniques know in the art, without limiting the scope of the disclosure.

Figure 5:
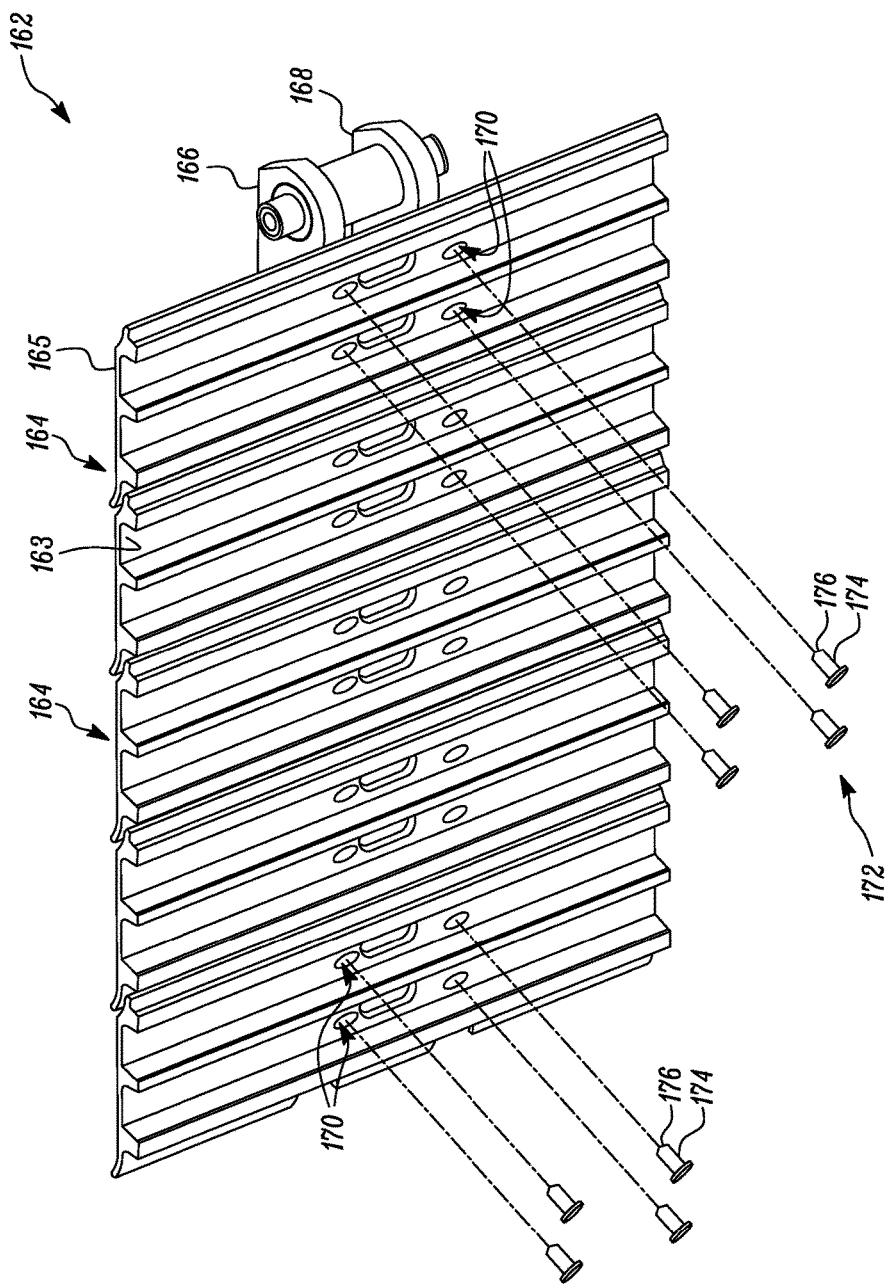
FIG. 5 is a perspective view of the track shoe and the pair of track links associated with the associated with the ground engaging track of the undercarriage assembly of FIG. 1, according to another embodiment of the present disclosure.

Referring to FIG. 5, the ground engaging track 162 is depicted, according to another embodiment of the present disclosure. The ground engaging track 162 includes the pair of track links 166, 168 and the number of track shoes 164 similar to the track links 136, 138 and the track shoes 122 of the ground engaging track 120 explained in reference to FIGS. 1 to 4. In the illustrated embodiment, the track shoe 164 of the ground engaging track 162 includes a number of second apertures 170. The second apertures 170 extend between the inner and outer surfaces 165, 163 of the track shoe 164. In one example, the track shoe 164 includes four second apertures 170. Alternatively, the track shoe 164 may include any number of second apertures 170, without limiting the scope of the disclosure.

The ground engaging track 162 includes the coupling mechanism 172 to couple the track shoes 164 with the track links 166, 168. The coupling mechanism 172 includes the coupling members 174 similar to the coupling members 158 of the ground engaging track 120. Each of the coupling members 174 includes the lower section 176. The coupling members 174 are aligned and received within the second apertures 170 of the track shoes 164, such that the lower section 176 of each of the coupling members 174 abuts the shoe surface (not shown) of the track link 166. The coupling members 174 are welded to the track link 166, such that the lower section 176 of each of the coupling members 174 are secured to the shoe surface of the track link 166, thereby coupling the track shoe 164 with the respective track link 166. It should be noted that the above description is also applicable to the coupling of the track link 168 and the track shoe 164, without any limitations.

The lower section 176 is welded to the track link 166 using resistance welding. More particularly, the welding may be ERW. The lower section 176 of each of the coupling members 174 may be welded to the track link 166 using various other welding techniques including, but not limited to, fusion welding or any other welding techniques know in the art, without limiting the scope of the disclosure.

Further, the track links 166, 168 may also include a number of mounting holes (not shown). The mounting holes may be embodied as blind holes extending from the shoe surface towards the rail surface (not shown) of the track link 166. The second apertures are aligned with the mounting holes to receive the coupling members 174, such that the lower section 176 of the coupling members 174 is received and welded within the mounting hole in order to couple the track link 166 and the track shoe 164.

Materials, dimensions, shape, and size of the track links 136, 138, 166, 168, the track shoes 122, 164, and various other components of the ground engaging tracks 120, 162 mentioned above may vary according to machine requirements, without limiting the scope of the disclosure.

INDUSTRIAL APPLICABILITY

The present disclosure relates to the ground engaging tracks 120, 162 that may be used in any mobile machine having a tracked undercarriage assembly. The coupling mechanisms 156, 172 disclosed herein provides a robust and reliable design for coupling of the track links 136, 138, 166, 168 with the respective track shoes 122, 164. Additionally, the disclosed embodiments provide improved strength and performance of the ground engaging tracks 120, 162. Thus, the disclosed embodiments provide a lower cost and high performance undercarriage assemblies.

The ground engaging track 120 shown in FIGS. 1 to 4, includes the coupling mechanism 156 having the coupling members 158. The coupling members 158 are adapted to be received within the first apertures 134 of the grousers 130 via the mounting holes 154 of the track link 136. The coupling members 158 are then welded to the track shoes 122, thereby coupling each of the track shoes 122 with the respective track links 136, 138. The above configuration of the ground engaging track 120 reduces overall manufacturing time and costs associated with the coupling of the track shoe 122 and the track link 136. Further, the above configuration provides a reliable and robust design, as the mounting holes 154 are angularly provided with respect to the shoe surface 152. The angled mounting holes 154 provide a clear line of sight and clearance to receive the coupling members 158 from track link side.

Also, the coupling members 158 are received within the first apertures 134 of the grousers 130, thereby providing additional material at the weld joint during the welding of the coupling members 158 with the track shoe 122. This in turn enhances strength of the coupling mechanism 156 of the ground engaging track 120.

Further, the second ground engaging track 162 shown in FIG. 5, includes the coupling mechanism 172 having the coupling members 174. The coupling members 174 are adapted to be received within the second apertures 170 of the track shoes 164. The coupling members 174 are then welded to the track links 166, 168 thereby coupling each of the track shoes 164 with the respective track links 166, 168. The above configuration of the second ground engaging track 162 reduces overall manufacturing time and costs associated with the coupling of the track links 166, 168 and the track shoes 164. Further, the coupling members 158, 174 do not protrude below the track shoe 122, 164, respectively, thus protecting the coupling members 158, 174 from wear during machine operation.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An undercarriage assembly associated with a machine, the undercarriage assembly comprising:
   a ground engaging track adapted to crawl on a ground surface, the ground engaging track comprising:
      a plurality of track shoes, each of the plurality of track shoes defining an inner surface and an outer surface, each of the plurality of track shoes having a grouser disposed on the outer surface and a plurality of second apertures extending between the inner and outer surfaces of the track shoe;
      a plurality of pairs of track links pivotally connected to one another, wherein each of the track links includes:
         a body member having a first side surface and a second side surface, the body member comprising:
            a shoe surface extending between the first and second side surfaces, wherein the shoe surface abuts the inner surface of the track shoe; and
            a mounting hole defined in the body member, the mounting hole extending angularly with respect to the shoe surface; and
         a coupling mechanism including a coupling member adapted to be received within the mounting hole such that the coupling member is inserted through each of the plurality of second apertures, wherein the coupling member is welded to the track shoe to couple each of the plurality of track shoes with the respective track links.

2. The undercarriage assembly of claim 1, wherein the mounting hole of the track link is positioned above the grouser of the track shoe.

3. The undercarriage assembly of claim 1, wherein a lower section of the coupling member is welded to the respective track shoe.

4. The undercarriage assembly of claim 3, wherein the grouser includes a plurality of first apertures, each of the plurality of first apertures being adapted to receive the lower section of the coupling member.

5. The undercarriage assembly of claim 1, wherein the mounting hole extends perpendicular to the shoe surface.

6. The undercarriage assembly of claim 1, wherein each of the plurality of track shoes is coupled to the respective track link by resistance welding.

7. A machine comprising:
   an engine;
   a frame; and
   an undercarriage assembly coupled to the frame and positioned at a clearance therewith, the undercarriage system comprising a ground engaging track adapted to crawl on a ground surface, the ground engaging track comprising:
      a plurality of track shoes defining an inner surface and an outer surface, each of the plurality of track shoes having a grouser disposed on the outer surface and a plurality of second apertures extending between the inner and outer surfaces of the track shoe;
      a plurality of pairs of track links pivotally connected to one another, wherein each of the track links includes:
         a body member having a first side surface and a second side surface, the body member comprising:
            a shoe surface extending between the first and second side surfaces, wherein the shoe surface abuts the inner surface of the track shoe;
            a mounting hole defined in the body member, the mounting hole extending angularly with respect to the shoe surface; and
         a coupling mechanism including a coupling member adapted to be received within the mounting hole such that the coupling member is inserted through each of the plurality of second apertures, wherein the coupling member is welded to the track shoe to couple the each of the plurality of track shoes with the respective track links.

8. The machine of claim 7, wherein the mounting hole of the track link is positioned above the grouser of the track shoe.

9. The machine of claim 7, wherein a lower section of the coupling member is welded to the respective track shoe.

10. The machine of claim 9, wherein the grouser includes a plurality of first apertures, each of the plurality of apertures being adapted to receive the lower section of the coupling member.

11. The machine of claim 7, wherein the mounting hole extends perpendicular to the shoe surface.

12. A track link comprising:
   a body member having a first side surface and a second side surface, the body member comprising:
      a shoe surface extending between the first and second side surfaces;
      a mounting hole defined in the body member, the mounting hole extending angularly with respect to the shoe surface, the mounting hole adapted to receive a coupling member, wherein the coupling member is inserted through a second aperture defined in a track shoe, such that a lower section of the coupling member is welded to the track link.

13. The track link of claim 12, wherein the mounting hole of the track link is positioned above the grouser of the track shoe.

14. The track link of claim 13, wherein the grouser includes a plurality of first apertures, each of the plurality of first apertures being adapted to receive a lower section of the coupling member, such that a lower section of the coupling member is welded to the grouser.

15. The track link of claim 12, wherein the mounting hole extends perpendicular to the shoe surface.

* * * * *